United States Patent
Maskell et al.

(10) Patent No.: US 10,392,023 B2
(45) Date of Patent: Aug. 27, 2019

(54) SYSTEM AND METHOD FOR DETERMINING WHETHER A TRAILER IS ATTACHED TO A VEHICLE

(71) Applicant: JAGUAR LAND ROVER LIMITED, Whitley, Coventry, Warwickshire (GB)

(72) Inventors: Andrew Maskell, Leamington Spa (GB); Gary Furst, Leamington Spa (GB)

(73) Assignee: JAGUAR LAND ROVER LIMITED, Whitley, Coventry (GB)

( * ) Notice: Subject to any disclaimer, the term of this patent is extended or adjusted under 35 U.S.C. 154(b) by 82 days.

(21) Appl. No.: 15/517,491

(22) PCT Filed: Sep. 23, 2015

(86) PCT No.: PCT/EP2015/071872
§ 371 (c)(1),
(2) Date: Apr. 6, 2017

(87) PCT Pub. No.: WO2016/055274
PCT Pub. Date: Apr. 14, 2016

(65) Prior Publication Data
US 2017/0305436 A1    Oct. 26, 2017

(30) Foreign Application Priority Data

Oct. 6, 2014 (GB) .................................. 1417602.8

(51) Int. Cl.
*G01M 17/04* (2006.01)
*B60W 40/11* (2012.01)
(Continued)

(52) U.S. Cl.
CPC ............... *B60W 40/11* (2013.01); *B60D 1/30* (2013.01); *B60D 1/62* (2013.01); *B60W 30/02* (2013.01);
(Continued)

(58) Field of Classification Search
CPC ....................................................... B60W 40/11
(Continued)

(56) References Cited

U.S. PATENT DOCUMENTS 6,636,047 B2 * 10/2003 Arlt ........................ B60Q 1/305
324/504
8,768,535 B2 * 7/2014 Kossira ................. B60T 8/1708
701/1
(Continued)

FOREIGN PATENT DOCUMENTS

DE 202008015740 U1 2/2009
DE 102009034678 A1 1/2011
(Continued)

OTHER PUBLICATIONS

Combined Search and Examination Report for application No. GB1417602.8, dated Mar. 18, 2015, 8 pages.
(Continued)

*Primary Examiner* — Eric S. McCall
(74) *Attorney, Agent, or Firm* — Reising Ethington P.C.

(57) ABSTRACT

A control system for a vehicle for determining whether a trailer is attached to the vehicle, the system being configured to receive an input of pitch data for the vehicle and to determine from the pitch data whether a trailer is attached to the vehicle.

17 Claims, 5 Drawing Sheets

(51) Int. Cl.
    B60W 40/12      (2012.01)
    B60W 50/00      (2006.01)
    B60W 30/02      (2012.01)
    B60D 1/30       (2006.01)
    B60D 1/62       (2006.01)
    G01C 19/5776    (2012.01)
    G01C 23/00      (2006.01)
    B60T 8/1755     (2006.01)
    B60T 8/24       (2006.01)

(52) U.S. Cl.
    CPC ........ B60W 40/12 (2013.01); B60W 50/0098 (2013.01); G01C 19/5776 (2013.01); G01C 23/00 (2013.01); *B60T 8/1755* (2013.01); *B60T 8/17551* (2013.01); *B60T 8/245* (2013.01); *B60T 2270/10* (2013.01); *B60W 2510/0657* (2013.01); *B60W 2520/105* (2013.01); *B60W 2520/14* (2013.01); *B60W 2520/16* (2013.01); *B60W 2530/22* (2013.01); *B60W 2720/00* (2013.01)

(58) Field of Classification Search
    USPC .......................................... 73/117.01, 117.03
    See application file for complete search history.

(56) References Cited

U.S. PATENT DOCUMENTS

| | | | |
|---|---|---|---|
| 9,956,965 B1* | 5/2018 | Hall | B60W 40/13 |
| 2005/0206224 A1* | 9/2005 | Lu | B60T 7/12 303/7 |
| 2005/0206235 A1 | 9/2005 | Tseng | |
| 2006/0187008 A1 | 8/2006 | Yu | |
| 2007/0103280 A1 | 5/2007 | Kanafani | |
| 2009/0271078 A1* | 10/2009 | Dickinson | G06K 9/3241 701/51 |
| 2009/0306861 A1 | 12/2009 | Schumann et al. | |
| 2010/0063666 A1 | 3/2010 | Schumann et al. | |
| 2013/0261843 A1* | 10/2013 | Kossira | B60T 8/1708 701/1 |
| 2014/0032040 A1 | 1/2014 | Schmidt et al. | |
| 2014/0195124 A1 | 7/2014 | Wellhoefer et al. | |
| 2015/0183284 A1* | 7/2015 | Kim | B60D 1/24 701/33.7 |
| 2016/0362135 A1* | 12/2016 | Xu | B62D 15/021 |

FOREIGN PATENT DOCUMENTS

| | | |
|---|---|---|
| DE | 102009053266 A1 | 5/2011 |
| GB | 2353340 A | 2/2001 |

OTHER PUBLICATIONS

International Search Report for International application No. PCT/EP2015/071872, dated Jan. 4, 2016, 9 pages.

Written Opinion for International application No. PCT/EP2015/071872, dated Jan. 4, 2016, 7 pages.

English machine translation for DE202008015740U1 published Feb. 26, 2009 in the name of GM Global Technology Operations Inc (7 pages).

* cited by examiner

SYSTEM AND METHOD FOR DETERMINING WHETHER A TRAILER IS ATTACHED TO A VEHICLE

TECHNICAL FIELD

This disclosure relates to a vehicle control system and method. Particularly, but not exclusively, this invention relates to a vehicle control system and method for detecting a trailer connected to a vehicle. Aspects of the invention relate to a system, vehicle, method and carrier medium.

BACKGROUND

When a vehicle, such as a car, van or truck, tows a trailer there is a possibility under certain conditions for the trailer to oscillate or "fish-tail" behind the vehicle. This can be particularly problematic at high road speeds and during critical maneuvers such as lane changes and sharp cornering.

Vehicle-trailer combinations typically act like damped systems in which the magnitude of a damping co-efficient associated with the system dictates the rate at which oscillations of the trailer decay after it has been displaced from a neutral position behind the towing vehicle, e.g. by a gust of wind, etc. With such a system, the greater the vehicle's road speed, the lower the damping co-efficient of the vehicle-trailer system becomes. Thus, the system becomes increasingly unstable as velocity increases. This problem is exacerbated by the fact that, in recent years, increasingly stringent vehicle emission regulations have resulted in decrease in average vehicle weight and studies have shown that this decrease in vehicle weight has had an adverse effect of vehicle stability, particularly when towing a trailer.

Many vehicles are provided with Electronic Stability Control (ESC) (also known as Electronic Stability Programs (ESP) and Dynamic Stability Control (DSC)) which help improve vehicle stability. When such a vehicle tows a trailer, ESC can help to improve the stability of the vehicle-trailer system by methods such as selectively braking individual wheels of the vehicle. However, the presence of a trailer must be detected in order for ESC to be applied.

It is known to use an electrical connection to determine whether a trailer is connected to a vehicle to allow an electrical supply to the trailer rear lights. The current or voltage running through this electrical connection can be detected and used to indicate that a trailer is attached to the vehicle. However, modern LED technology has the disadvantage that the currents used are so low that reliable detection is difficult. Generally the detection of a trailer is done once at "key-on" and not thereafter so if a trailer is hitched/unhitched without turning the engine off then there will be no detection in a change of the trailer status. In addition there are events wherein the trailer electronics are connected but the vehicle is not towing, for example if bikes are attached to the rear of a vehicle in a manner that obscures the lights or registration it is common to use an auxiliary light board containing the registration plate attached to the rear of the vehicle or to the bikes in a viewable position so that the vehicle is in compliance with legal requirements. Such auxiliary light boards are generally connected to the trailer electronic outlet. Furthermore, this method does not give any information about the trailer.

It is also known to use sensors to detect any lag in yaw of the vehicle to determine whether a trailer is attached. Yaw is rotational motion of the vehicle about its vertical axis, resulting in a change to the direction the vehicle is pointing, i.e. to the left or right of its direction of motion. A trailer will affect the time between a change in steering angle and the resulting yaw; this lag can be used to detect whether a trailer is attached to the tow vehicle.

Another known method is to measure the drag on the engine torque due to the extra weight of the trailer.

These two latter methods, i.e. measuring the lag in yaw and the drag on torque, have the disadvantage that whilst they work well when the attached trailer is of sufficient mass/length to substantially alter the vehicle's character, it becomes difficult to distinguish the trailer attachment from noise as the trailer's critical dimensions are reduced. In addition other factors such as the drag on the vehicle due to the surface of the terrain may influence detection based on drag/engine torque. In addition, these methods can only be used to identify a trailer when the tow vehicle is moving but not when it is stationary.

It is an aim of the present invention to address disadvantages associated with the prior art.

A further aim of the present invention is to improve the detection rate of prior art methods.

A further aim of the present invention is to improve the accuracy of prior art methods.

SUMMARY OF THE INVENTION

Aspects of the invention relate to a system, a vehicle, a controller, a method, a carrier medium and a program that use of data relating to the pitch of a vehicle to determine whether a trailer is attached to the vehicle.

According to an aspect of the invention, there is provided a system for determining whether a trailer is attached to a vehicle, the system comprising:
 means for
 receiving a pitch data signal indicative of the pitch of the vehicle and
 determining automatically from the pitch data signal whether a trailer is attached to the vehicle.

According to an aspect of the invention, there is provided a system for determining whether a trailer is attached to a vehicle, the system comprising:
 an electronic processor having an electrical input for receiving a pitch data signal for the vehicle, the pitch data signal being automatically generated and output by a pitch detector;
 an electronic memory device electrically coupled to the electronic processor and having instructions stored therein,
wherein the electronic processor is configured to access the memory device and execute the instructions stored therein such that it is operable to:
 determine from the pitch data whether a trailer is attached to the vehicle.

The system may comprise a controller and suitably comprises a control unit or computational device having one or more electronic processors.

Use of the pitch data to determine whether a trailer is attached, in combination with other known methods, improve both the detection rate and accuracy of the known prior art methods. As a trailer may exert leverage on the vehicle even when stationary, use of the pitch data may be used to assist in the determination of whether a trailer is attached to the vehicle when the vehicle is stationary. To do so it may be necessary to determine that other influences, for example a heavy load added to the trunk, passengers getting on board, etc., are not the cause of changed pitch. This may be done by detecting if the tailgate is open, if occupancy sensors show seats have become occupied etc. Such detection may be used in combination with pitch data received when the vehicle starts moving to increase the accuracy of a towing prediction.

The pitch data collected over a time period forms a pitch profile of the vehicle. The pitch profile may comprise parameters relating to the detected pitch of the vehicle. The pitch profile may comprise an average of detected pitch parameters. The pitch profile may comprise pitch frequency measured over a time period. For example, the pitch profile may comprise the average pitch frequency measured over a time period. The effect of a trailer attached to a vehicle is to change the pitch profile of the vehicle.

The pitch data signal may comprise pitch frequency of the vehicle when in motion. The system may be configured to calculate pitch frequency from the pitch data signal while the vehicle is in motion. For example, the pitch frequency may be calculated from the raw pitch data in the brakes subsystem controller (such as the ABS controller).

In one embodiment, the electronic processor is configured to calculate pitch frequency from the pitch data signal while the vehicle is in motion.

The pitch data is indicative not only of whether a trailer is attached to the vehicle but can give information about the leverage applied on the vehicle by the trailer and thus give information about the trailer itself.

Parameters which effect the pitch data of the vehicle include the dimensions of the hitch point to a trailer axle center line, height of tow hitch or hook, trailer mass, trailer tire size and pressure. These parameters all define the leverage applied by the trailer to the vehicle.

In one embodiment means for determining from the pitch data whether a trailer is attached to the vehicle comprises a look up table of pitch data and wherein the system is configured to compare the measured pitch data with the look up table in order to determine whether a trailer is attached to the vehicle.

Use of a look up table enables multiple pitch data (such as pitch profiles) relating to different trailers to be stored. Data relating to the different trailers may be stored with the pitch data, for example leverage applied to vehicle, trailer mass, tire size and distance from trailer axle center line to tow hitch/hook point.

In another embodiment, means for determining from the pitch data whether a trailer is attached to the vehicle comprises an algorithm and wherein the system is configured to use the algorithm to determine from the pitch data whether a trailer is attached to the vehicle.

The output from the algorithm may be indicative of parameters of the trailer, for example the leverage applied to the vehicle.

The electronic processor may be configured to compare measured pitch data with a look up table in order to determine whether a trailer is attached to the vehicle. Alternatively or in addition, the electronic processor may be configured to use an algorithm to determine from the pitch data whether a trailer is attached to the vehicle. The electronic processor may be configured to use the look up table or algorithm to output trailer parameter data relating to the trailer parameters.

The look up table or algorithm may be configured to output trailer parameter data relating to the trailer parameters. The trailer parameter data may comprise a calculated or determined leverage applied by the trailer to the vehicle.

In another embodiment, the system is configured to receive inputs from detectors detecting parameters of the vehicle movement other than pitch. The system may be configured to receive inputs selected from one or more of the yaw rate, longitudinal acceleration, engine torque, tailgate sensors, occupancy sensing and suspension travel and wherein the system uses one or more of these inputs in addition to the pitch data to determine whether a trailer is attached to the vehicle while the vehicle is in motion.

The electronic processor may be configured to receive inputs selected from one or more of the yaw rate, longitudinal accelerometer and engine torque and to use one or more of these inputs in addition to the pitch data to determine whether a trailer is attached to the vehicle while the vehicle is in motion.

Combination of the input from the pitch detection means with other data increases the accuracy for determining whether a trailer is attached to a vehicle. This is particularly important for small trailers of low mass.

In another embodiment the system comprises means for electronic stability control while the vehicle is in motion and wherein the system is configured to send a signal to the means for electronic stability control indicative of a trailer being attached to the vehicle. The system may also send trailer parameter data to the means for electronic stability control.

The system may comprise an electronic stability controller while the vehicle is in motion and wherein the electronic processor is configured to send a signal to the electronic stability controller indicative of a trailer being attached to the vehicle.

The means for electronic stability control can adjust vehicle systems such as the brakes to counteract any adverse effects of the trailer, for example the force applied to individual brakes can be varied. The electronic stability controller can adjust vehicle systems such as the brakes to counteract any adverse effects of the trailer, for example the force applied to individual brakes can be varied. This control can be quantitative, the adjustments to the vehicle systems being optimized to the particular trailer parameters if this data is sent to the electronic stability control means.

The means for electronic stability control may comprise intervention parameters that determine one or more of the thresholds at which the means for electronic stability control intervenes and the extent to which the means for electronic stability control intervenes, in dependence on said signal indicative of a trailer being attached to the vehicle.

According to an aspect of the invention, there is provided a control system for a vehicle for determining whether a trailer is attached to the vehicle, the system being configured to:

receive a pitch data signal for the vehicle, said pitch data signal automatically generated and output by pitch detection means, and determine from the pitch data whether a trailer is attached to the vehicle.

The control system may comprise a controller and suitably comprises a control unit or computational device having one or more electronic processors.

In one embodiment the control system comprises a look up table of pitch data and wherein the control system is configured to compare the measured pitch data with the look up table in order to determine whether a trailer is attached to the vehicle.

In another embodiment the control system comprises an algorithm and wherein the control system is configured to use the algorithm to determine from the pitch data whether a trailer is attached to the vehicle.

According to a further aspect of the invention, there is provided a vehicle comprising a control system according to an aspect of this invention.

In one embodiment the vehicle comprises means for detecting the pitch of the vehicle. In one embodiment the vehicle comprises a pitch detector for detecting the pitch of the vehicle. For example, pitch detecting means may comprise an inertial measurement unit (IMU) sensor. A typical IMU may measure pitch, roll and yaw using gyroscopes, for example MEMS gyroscopes.

In another embodiment the vehicle comprises at least one of means for detecting yaw rate, means for detecting longitudinal acceleration, means for detecting longitudinal acceleration and means for measuring engine torque. The combination of one or more of these in combination with the pitch detecting means increases the accuracy of the determination of whether a trailer is present.

The vehicle may comprise at least one of a yaw rate detector, a longitudinal acceleration detector and engine torque detector. The combination of one or more of these in combination with the pitch detector increases the accuracy of the determination of whether a trailer is present.

According to a still further aspect of the invention, there is provided a method of detecting whether a trailer is connected to a vehicle, the method comprising receiving a pitch data signal for the vehicle, said pitch data signal automatically generated and output by means for detecting pitch and determining from the pitch data whether a trailer is attached to the vehicle.

According to a still further aspect of the invention, there is provided a method of determining whether a trailer is attached to a vehicle, the method comprising receiving an input of pitch data for the vehicle from a pitch detector and determining from the pitch data whether a trailer is attached to the vehicle.

The pitch data may comprise pitch frequency of the vehicle when in motion, for example the frequency over a time period. The pitch frequency may be calculated from the pitch data signal while the vehicle is in motion.

In one embodiment the method comprises comparing the pitch data to a look up table of pitch data in order to determine whether a trailer is attached to the vehicle.

In another embodiment the method comprises using an algorithm to determine from the pitch data whether a trailer is attached to the vehicle.

The look up table or algorithm may be configured to output trailer parameter data relating to the trailer parameters. The trailer parameter data may comprise the leverage applied by the trailer to the vehicle.

The method may comprise detecting one or more of the yaw rate, longitudinal acceleration and engine torque of the vehicle and using one or more of these inputs in addition to the pitch data to determine whether a trailer is attached to the vehicle while the vehicle is in motion.

The method may comprise sending a signal to a means for electronic stability control indicative of a trailer being attached to the vehicle. In one embodiment, the means for electronic stability control comprises intervention parameters that determine one or more of the thresholds at which the means for electronic stability control intervenes, in dependence on said signal indicative of a trailer being attached to the vehicle and the extent to which the means for electronic stability control intervenes.

According to a still further aspect of the invention, there is provided a carrier medium carrying computer readable code for controlling a vehicle to carry out the method of any aspect of this invention.

According to a still further aspect of the invention, there is provided a computer program executable on a processor so as to implement the method of any aspect of this invention.

According to a still further aspect of the invention, there is provided a computer readable medium loaded with a computer program so as to implement the method of any aspect of this invention.

According to a still further aspect of the invention, there is provided an electronic controller for a vehicle having a storage medium associated therewith storing instructions that when executed by the controller causes the determination of a trailer being attached to the vehicle in accordance with the method of: receiving a pitch data signal for the vehicle, said pitch data signal automatically generated and output by pitch detection means and determining from the pitch data whether a trailer is attached to the vehicle.

According to a still further aspect of the invention, there is provided a non-transitory, computer-readable storage medium storing instructions thereon that when executed by one or more electronic processors causes the one or more electronic processors to carry out the method of aspects of the invention.

Any controller or controllers described herein may suitably comprise a control unit or computational device having one or more electronic processors. Thus the system may comprise a single control unit or electronic controller or alternatively different functions of the controller may be embodied in, or hosted in, different control units or controllers. As used herein the term "controller" or "control unit" will be understood to include both a single control unit or controller and a plurality of control units or controllers collectively operating to provide any stated control functionality. To configure a controller, a suitable set of instructions may be provided which, when executed, cause said control unit or computational device to implement the control techniques specified herein. The set of instructions may suitably be embedded in said one or more electronic processors. Alternatively, the set of instructions may be provided as software to be executed on said computational device. A first controller may be implemented in software run on one or more processors. One or more other controllers may be implemented in software run on one or more processors, optionally the same one or more processors as the first controller. Other suitable arrangements may also be used.

Throughout the description and claims of this specification, the words "comprise" and "contain" and variations of the words, for example "comprising" and "comprises", mean "including but not limited to", and do not exclude other components, integers or steps. Moreover the singular encompasses the plural unless the context otherwise requires: in particular, where the indefinite article is used, the specification is to be understood as contemplating plurality as well as singularity, unless the context requires otherwise.

Preferred features of each aspect of the invention may be as described in connection with any of the other aspects. Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
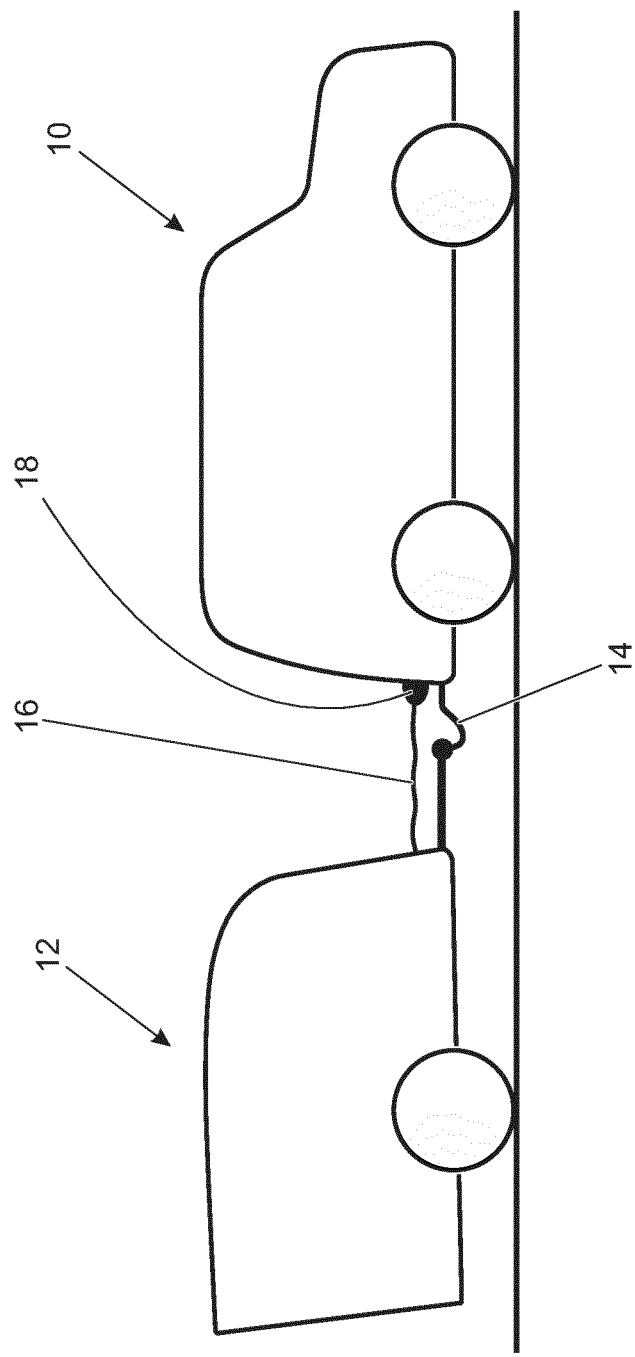
FIG. 1 is a schematic illustration of a tow vehicle and trailer according to an embodiment of the invention.

FIG. 1 shows a vehicle 10 towing a trailer 12. The vehicle typically comprises a car, van or truck. The trailer comprises an unpowered towed vehicle and includes caravans, freight trailers, domestic trailers, etc. The trailer 12 is connected to the vehicle 10 by means of a tow hitch or hook 14 of the vehicle 10. The trailer 12 has an electrical service cable 16 that is connectable to a corresponding connector 18 of the vehicle 10. This allows the vehicle to supply power to rear lamps of the trailer 12 such as indicator lamps, brake lamps, license plate illumination and night riding lamps.

Figure 2:
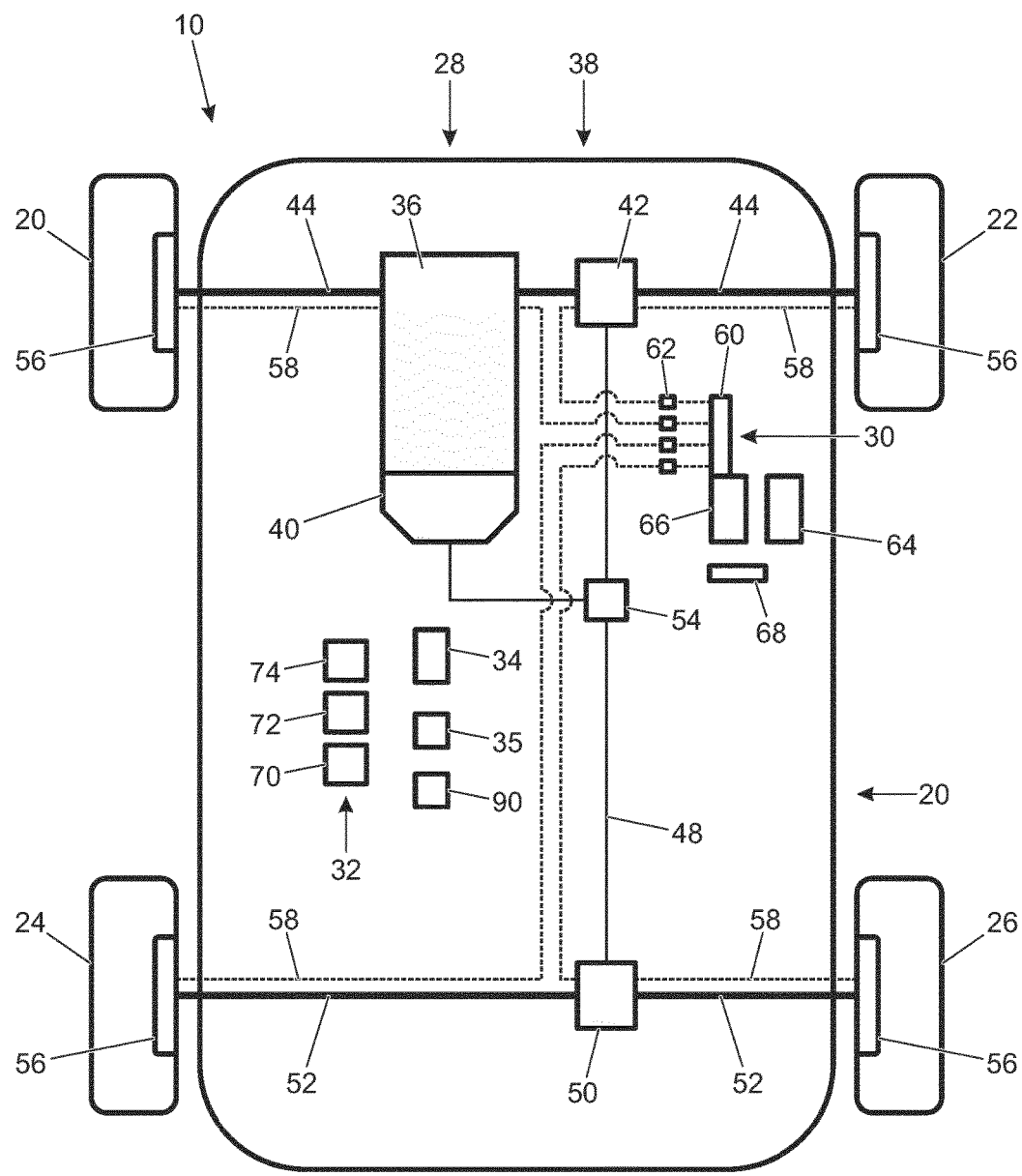
FIG. 2 is a schematic illustration of a vehicle according to an embodiment of the present invention.

FIG. 2 shows a vehicle 10 according to an embodiment of the invention. The vehicle 10 comprises a pair of front wheels 20,22, a pair of rear wheels 24,26, a powertrain 28, a brake system 30, vehicle sensors 32, and a vehicle control unit (VCU) 34.

The powertrain 28 comprises an engine 36 for generating torque and a driveline 38 having a transmission 40 for transmitting the torque to the wheels 20,22. The driveline 38 is arranged to drive the front wheels 20,22 by means of a front differential 42 and a pair of front drive shafts 44. The driveline 38 also comprises an auxiliary driveline portion 46 arranged to drive the rear wheels 24,26 by means of an auxiliary driveshaft or prop-shaft 48, a rear differential 50 and a pair of rear driveshafts 52. Embodiments of the invention are suitable for use with vehicles in which the engine is arranged to drive only a pair of front wheels or only a pair of rear wheels (i.e. front wheel drive vehicles or rear wheel drive vehicles) or selectable two wheel drive/four wheel drive vehicles. In the embodiment of FIG. 2 the engine 36 is releasably connectable to the auxiliary driveline portion 46 by means of a power transfer unit (PTU) 54, allowing selectable two wheel drive or four wheel drive operation. It is to be understood that embodiments of the invention may be suitable for vehicles having more than four wheels or where only two wheels are driven, for example two wheels of a three wheeled vehicle or four wheeled vehicle or a vehicle with more than four wheels.

The PTU 54 is operable in a 'high ratio' or a 'low ratio' configuration, in which a gear ratio between an input shaft and an output shaft thereof is selected to be a high or low ratio. The high ratio configuration is suitable for general on-road or 'on-highway' operations in an on-road mode of the vehicle, whilst the low ratio configuration is more suitable for negotiating certain off-road terrain conditions and other low speed applications such as towing.

The brake system 30 of the vehicle 10 comprises four hydraulic disc brakes 56, one for each wheel 20,22,24,26 of the vehicle. The disc brakes 56 are individually operable by imparting hydraulic pressure via hydraulic lines 58 connecting each brake to a master cylinder 60. Each hydraulic line 58 is in communication with hydraulic pressure control means 62 for increasing or decreasing hydraulic pressure in the line 58 based on electronic commands. Such hydraulic pressure control means 62 are well known in the art.

The vehicle 10 has an accelerator pedal 64 for indicating a demanded torque output of the powertrain 28, a brake pedal 66 for indicating a desired braking effort to be supplied by the brake system 30, and a steering wheel 68 for steering at least the front wheels.

The vehicle has an electronic controller, referred to as a vehicle control unit (VCU) 34. The VCU may suitably comprise a control unit or computational device having one or more electronic processors. The VCU controls various systems, subsystems and components of the vehicle electronically. Although only a few systems, subsystems and components are illustrated as being under the control of the VCU 34, in practice a greater number of systems, subsystems and components may be included on the vehicle 10 and may be under the control of the VCU 34. Each subsystem typically has a controller that controls that subsystem, for example including but not limited to a powertrain subsystem controller, a brakes subsystem controller, and a chassis management subsystem controller. The subsystem controllers and the VCU are in communication with one another using a CAN interface or similar. Such communication may be facilitated via any suitable wired or wireless connection, such as, for example, a controller area network (CAN) bus, a system management bus (SMBus), a proprietary communication link, or through some other arrangement known in the art. In any event, in an embodiment, the brake subsystem has a brakes subsystem controller 35 (for example an ABS controller).

For purposes of this disclosure, and notwithstanding the above, it is to be understood that the controller(s) or electronic control unit(s) ECU(s) described herein may each comprise a control unit or computational device having one or more electronic processors. Vehicle 10 and/or a subsystem thereof may comprise a single control unit or electronic controller or alternatively different functions of the controller(s) may be embodied in, or hosted in, different control units or controllers. As used herein, the term "control unit" will be understood to include both a single control unit or controller and a plurality of control units or controllers collectively operating to provide the required control functionality. A set of instructions could be provided which, when executed, cause said controller(s) or control unit(s) to implement the control techniques described herein (including the method(s) described below). The set of instructions may be embedded in one or more electronic processors, or alternatively, may be provided as software to be executed by one or more electronic processor(s). For example, a first controller may be implemented in software run on one or more electronic processors, and one or more other controllers may also be implemented in software run on or more electronic processors, optionally the same one or more processors as the first controller. It will be appreciated, however, that other arrangements are also useful, and therefore, the present invention is not intended to be limited to any particular arrangement. In any event, the set of instructions described above may be embedded in a computer-readable storage medium (e.g., a non-transitory storage medium) that may comprise any mechanism for storing information in a form readable by a machine or electronic processors/computational device, including, without limitation: a magnetic storage medium (e.g., floppy diskette); optical storage medium (e.g., CD-ROM); magneto optical storage medium; read only memory (ROM); random access memory (RAM); erasable programmable memory (e.g., EPROM ad EEPROM); flash memory; or electrical or other types of medium for storing such information/instructions.

The brakes control subsystem controller 35 receives information from the vehicle sensors 32, either directly or indirectly from another subsystem controller that communicates with the sensors and publishes signals therefrom to the CAN which are read by the brakes subsystem controller 35. The vehicle sensors 32 include wheel speed sensors, a vehicle reference speed sensor 70, an engine torque sensor 72, and a six degree of freedom inertial measurement unit (IMU) 74. The IMU 74 provides the brakes subsystem controller 35 with pitch data, yaw data, roll data, surge data, sway data and heave data for the vehicle. Suitable IMUs are known in the art and described, for example IMU BMI055 produced by Bosch-Sensortec which measures six degrees of freedom. The brakes system controller 35 is configured to store vehicle pitch data in a memory 90.

Alternative sensors for detecting pitch are described in GB2510417, in which each wheel is provided with a height sensor which measures the height of the vehicle body in relation to the wheel. For example, the height sensor which is attached to the rear right wheel of the vehicle measures the height of a predetermined point on the vehicle body with respect of the rear right wheel. The difference in height between the front and rear wheels is used to calculate the pitch. Suitable sensors include cameras, such as CCD detectors. It will be appreciated that alternatively any type of linear motion sensors may be used to determine damper displacement as a measure of vehicle body displacement relative to wheel position. Accuracy of the pitch calculation can be enhanced by also using inputs from a wheel speed detection means in the form of a wheel speed sensor; means for measuring the rate of change in pitch, roll and yaw of the vehicle body in the form of a pitch, roll, yaw rate of change detector, for example a MEMS gyroscope; and means for measuring linear acceleration of the vehicle body in x,y and z axes, in the form of from three linear acceleration detectors, for example linear accelerometers. The linear acceleration sensors and MEMS gyroscopic sensors may all form part of a single six degree of freedom IMU.

Figure 3:
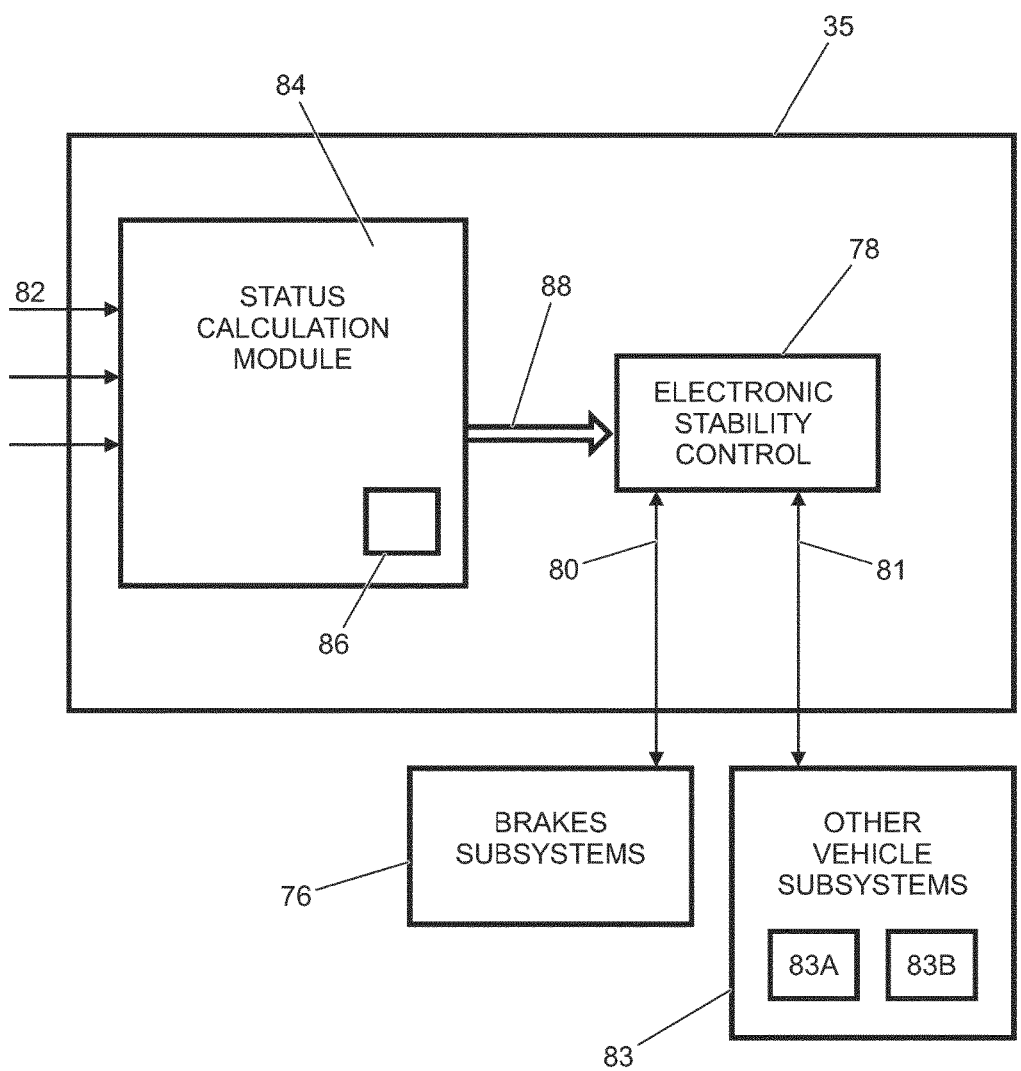
FIG. 3 is a block diagram to illustrate a control system in accordance with an embodiment of the invention.

FIG. 3 shows the brakes subsystem controller 35 in more detail. The brakes subsystem controller 35 controls the brakes subsystem 76. The brakes subsystem controller 35 includes an electronic stability control means in the form of an electronic stability controller 78 which provides control signals via line 80 to the brakes subsystem 76 in a manner appropriate to whether a trailer is attached. The electronic stability controller 78 may send control signals to the braking system 76 to individually apply the brakes to each of the wheels, to maintain or restore stability of the vehicle if instability is detected. The nature of these brake interventions will be different dependent upon whether it is detected that trailer is attached The electronic stability controller 78 may send control signals via line 81 to the controllers of other vehicle subsystems 83, including, but not limited to, an engine management system 83*a* and a transmission system 83*b*. The controllers of these subsystems may send control signals to the vehicle subsystems, for example to reduce engine power or to use transmission to slow the vehicle.

The brakes subsystem controller 35 receives a plurality of signals, represented generally at 82 which are received from a plurality of vehicle sensors and are representative of a variety of different parameters associated with vehicle motion. The signals 82 include inputs originating from the IMU which provides information on the vehicle pitch but can also include, signals relating to yaw, roll longitudinal, lateral and vertical acceleration. In addition signals may be received indicative of engine torque (for example originating from an engine torque sensor or engine torque estimator), vehicle speed (for example originating from a speed over ground sensor) vehicle reference speed (calculated in the ABS controller from the speeds of the individual wheels) and/or indicative of steering angle, for example originating from a steering wheel angle sensor or a steered wheel angle sensor. The brakes subsystem controller 35 uses these signals to determine whether a trailer is connected to the vehicle, as described in more detail below. In other embodiments, only a selection of the aforementioned sensors and/or signals may be used to determine whether a trailer is connected to the vehicle.

The brakes subsystem controller 35 includes a status calculation means in the form of a status calculation module or processor 84.

Within status calculation module 84, the input from the pitch sensor means 82 are used to calculate a pitch profile of the vehicle.

Figure 4:
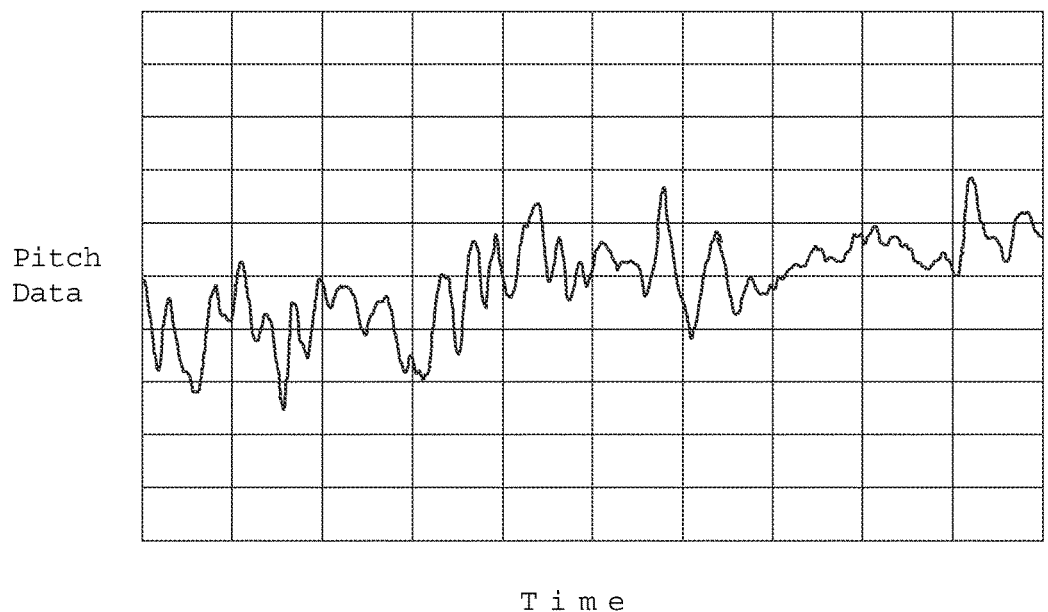
FIG. 4 is graph showing the pitch profile of a vehicle in accordance with an embodiment of the invention without a trailer.
Figure 5:
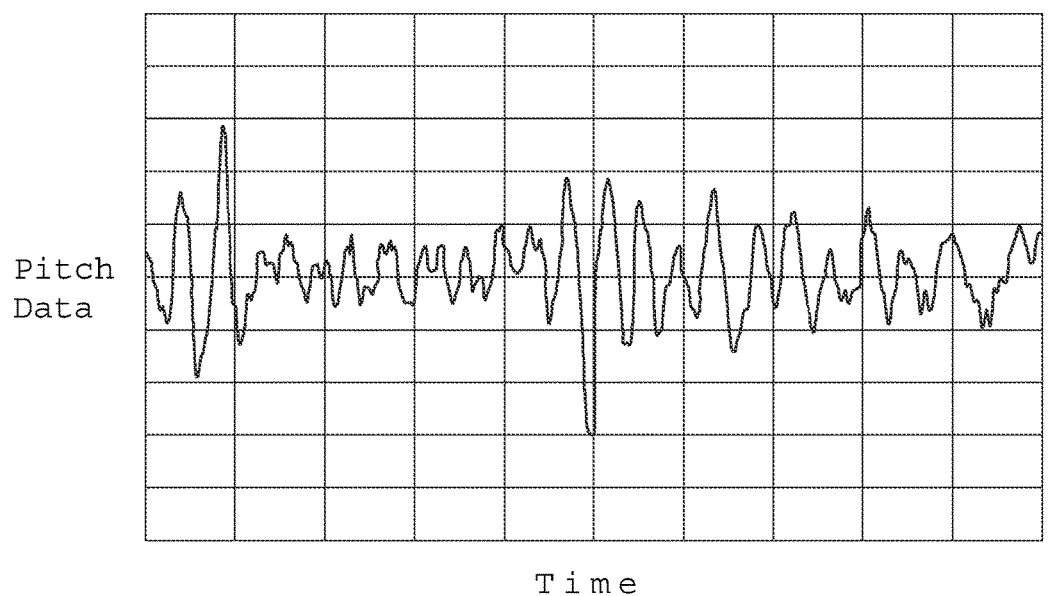
FIG. 5 is a graph showing the pitch profile of a vehicle in accordance with an embodiment of the invention with a trailer.

FIGS. 4 and 5 show the pitch profiles of a vehicle without a trailer and with a 300 kg trailer respectively. The pitch profile of FIG. 4 has a frequency of 3.54 Hz, whilst the pitch profile of FIG. 5 has a frequency of 2.5 Hz. This difference in frequency is used to detect the presence or absence of a trailer.

The status calculation module 84 uses a look up table or algorithm 86 to determine from the pitch profile whether a trailer is present. The look up table includes a range of pitch profiles which correspond to various vehicle and trailer combinations or vehicles without trailers. Comparison of the detected pitch profile with the pitch profiles in the look up table is used to determine whether or not a trailer is present and the parameters, such as weight/length or leverage, of the trailer. Alternatively, an algorithm can be used to determine whether a trailer is attached to the vehicle, for example by determining whether the pitch frequency is above or below a threshold level.

The status calculation module 84 may combine the detected pitch profile with the speed of the vehicle to increase accuracy of detecting whether a trailer is attached to the vehicle. In this case, the look up table must contain pitch profiles correlating to different vehicle speeds, for comparison with the measured data. As the speed of the vehicle effects the damping effect of the trailer, the combination of vehicle speed data with the pitch profile increases the accuracy of determining whether a trailer is attached to the vehicle. Likewise, an algorithm can use both vehicle speed and vehicle pitch data to determine whether a trailer is attached to the vehicle.

The status calculation module 84 may use inputs from other sensors in addition to the pitch sensors to determine whether the trailer is present. For example, yaw rate, longitudinal accelerometer and engine torque may be used. By using these extra parameters in addition to pitch, accuracy may be increased.

The status calculation module 84 produces an output 88 indicating whether a trailer is connected.

The damping effect of the vehicle-trailer combination is dependent on the properties of the trailer, for example its weight and length. The vehicle pitch profile is therefore indicative of the properties of the trailer which is connected to the vehicle and this can be used to categorize the trailer, for example by weight and length. The pitch profiles in the look-up table may be categorized, for example by weight (i.e. light, heavy, very heavy) and length (short, long etc.). Comparison of the detected pitch profile with the pitch profiles in the look-up table enables the trailer category to be determined.

The output 88 from the status calculation module 84 may include information relating to the trailer, such as weight/length ratio or leverage. For example output 88 may include the trailer weight category and/or length category of the trailer.

Output 88 is sent to the electronic stability controller 78. The configuration of the braking subsystem 76 and other subsystems 83 may be adjusted depending on the presence or absence of a trailer. For example, the braking subsystem 76 may be arranged to selectively brake individual wheels of the vehicle to help improve vehicle stability, thereby mitigating against increased yaw caused by the trailer.

This output 88 may also include information relating to the trailer, such as its weight and/or length category. Operating parameters of the electronic stability controller (ESC) may be adjusted based on the category of trailer which is detected. For example, the intervention levels at which the ECS intervenes to control stability may be adjusted for different trailer categories. Likewise, the magnitude of any ESC interventions may be adjusted for different trailer categories. For example a vehicle towing very heavy trailer will require earlier intervention (for example braking) and intervention of a higher magnitude than a vehicle towing a light trailer.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The invention claimed is:

1. A system for determining whether a trailer is attached to a vehicle, the system comprising:
    an electronic processor for receiving pitch data indicative of the pitch of the vehicle, wherein the pitch data comprises, or is used to calculate, a pitch frequency of the vehicle when in motion,
    an electronic memory device electrically coupled to the electronic processor and having instructions stored therein,
    wherein the electronic processor is configured to access the memory device and execute the instructions stored therein such that the electronic processor is operable to:
    calculate a pitch profile of the vehicle from the pitch frequency, and
    determine from the pitch profile whether a trailer is attached to the vehicle.

2. A system according to claim 1, wherein the system is configured to receive inputs from at least one of a pitch detector, a yaw rate detector, an accelerometer and a dynamometer for measuring engine torque, and wherein the system uses one or more of these inputs in addition to the pitch data to determine whether a trailer is attached to the vehicle while the vehicle is in motion.

3. A vehicle comprising a system according to claim 1.

4. A system according to claim 1, wherein the system comprises an electronic stability controller while the vehicle is in motion and wherein the system is configured to send a signal to the electronic stability controller indicative of a trailer being attached to the vehicle.

5. A system according to claim 4 wherein the electronic stability controller comprises intervention parameters that determine one or more of the thresholds at which the electronic stability controller intervenes and the extent to which the electronic stability controller intervenes, in dependence on said signal indicative of a trailer being attached to the vehicle.

6. A system according to claim 1, wherein determining from the pitch profile whether a trailer is attached to the vehicle comprises either comparing the measured pitch profile to a look up table of pitch profiles or inputting the pitch profile into an algorithm in order to determine whether a trailer is attached to the vehicle.

7. A system according to claim 6, wherein the look up table or algorithm is configured to output trailer parameter data relating to one or more trailer parameters.

8. A system according to claim 7, wherein the trailer parameter data comprises the leverage applied by the trailer to the vehicle.

9. A method of detecting whether a trailer is connected to a vehicle, the method comprising:
    receiving one or more electrical signals representative of pitch data indicative of a measured pitch of the vehicle, wherein the pitch data comprises, or is used to calculate, a pitch frequency of the vehicle when in motion,
    calculating a pitch profile from the pitch frequency, and
    determining from the pitch profile whether a trailer is attached to the vehicle.

10. A method according to claim 9, comprising detecting one or more of the yaw rate, longitudinal acceleration and engine torque and using one or more of these inputs in addition to the pitch frequency to determine whether a trailer is attached to the vehicle while the vehicle is in motion.

11. A non-transitory carrier medium carrying computer readable code for controlling a vehicle to carry out the method of claim 9.

12. A method according to claim 9, comprising sending a signal to an electronic stability controller indicative of a trailer being attached to the vehicle.

13. A method according to claim 12 wherein the electronic stability controller comprises intervention parameters that determine one or more of the thresholds at which the electronic stability controller intervenes and the extent to which the electronic stability controller intervenes, in dependence on said signal indicative of a trailer being attached to the vehicle.

14. A method according to claim 9, comprising comparing the pitch frequency to a look up table of pitch frequencies, or inputting the pitch frequency into an algorithm, in order to determine whether a trailer is attached to the vehicle.

15. A method according to any of claim 14, wherein the look up table or algorithm is configured to output trailer parameter data relating to the trailer parameters.

16. A method according to claim 15, wherein the trailer parameter data comprises the leverage applied by the trailer to the vehicle.

17. An electronic controller for a vehicle having a storage medium associated therewith storing instructions that when executed by the controller causes the determination of a trailer being attached to the vehicle in accordance with the method of:
   receiving one or more electrical signals representative of pitch data indicative of a measured pitch of the vehicle, wherein the pitch data comprises, or is used to calculate, a pitch frequency of the vehicle when in motion,
   calculating a pitch profile from the pitch frequency,
   and determining from the pitch profile whether a trailer is attached to the vehicle.

\* \* \* \* \*